(12) United States Patent
Qi et al.

(10) Patent No.: US 9,949,223 B2
(45) Date of Patent: *Apr. 17, 2018

(54) SYSTEMS, APPARATUS AND METHODS USING SYNC BEACONS IN NEIGHBOR AWARENESS NETWORKING (NAN)

(71) Applicant: Intel IP Corporation, Santa Clara, CA (US)

(72) Inventors: Emily H. Qi, Gig Harbor, WA (US); Minyoung Park, Portland, OR (US)

(73) Assignee: Intel IP Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/443,614

(22) Filed: Feb. 27, 2017

(65) Prior Publication Data
US 2017/0273040 A1    Sep. 21, 2017

Related U.S. Application Data

(63) Continuation of application No. 14/125,870, filed as application No. PCT/US2013/052288 on Jul. 26, 2013, now Pat. No. 9,585,112.

(60) Provisional application No. 61/809,988, filed on Apr. 9, 2013.

(51) Int. Cl.
*H04W 56/00* (2009.01)
*H04W 84/10* (2009.01)

(52) U.S. Cl.
CPC ......... *H04W 56/001* (2013.01); *H04W 56/00* (2013.01); *H04W 84/10* (2013.01)

(58) Field of Classification Search
CPC .... H04W 56/011; H04W 84/10; H04W 56/00
See application file for complete search history.

(56) References Cited

U.S. PATENT DOCUMENTS 9,585,112 B2 * 2/2017 Qi ...................... H04W 56/001

* cited by examiner

*Primary Examiner* — Mohammad S Anwar

(57) ABSTRACT

Techniques are disclosed using Sync Beacons in neighbor awareness networking (NAN) in wireless networks, wherein the Sync Beacon frames use Public Action frames for the Sync Beacon. Such networks include (but are not limited to) IEEE 802.11 networks.

20 Claims, 1 Drawing Sheet

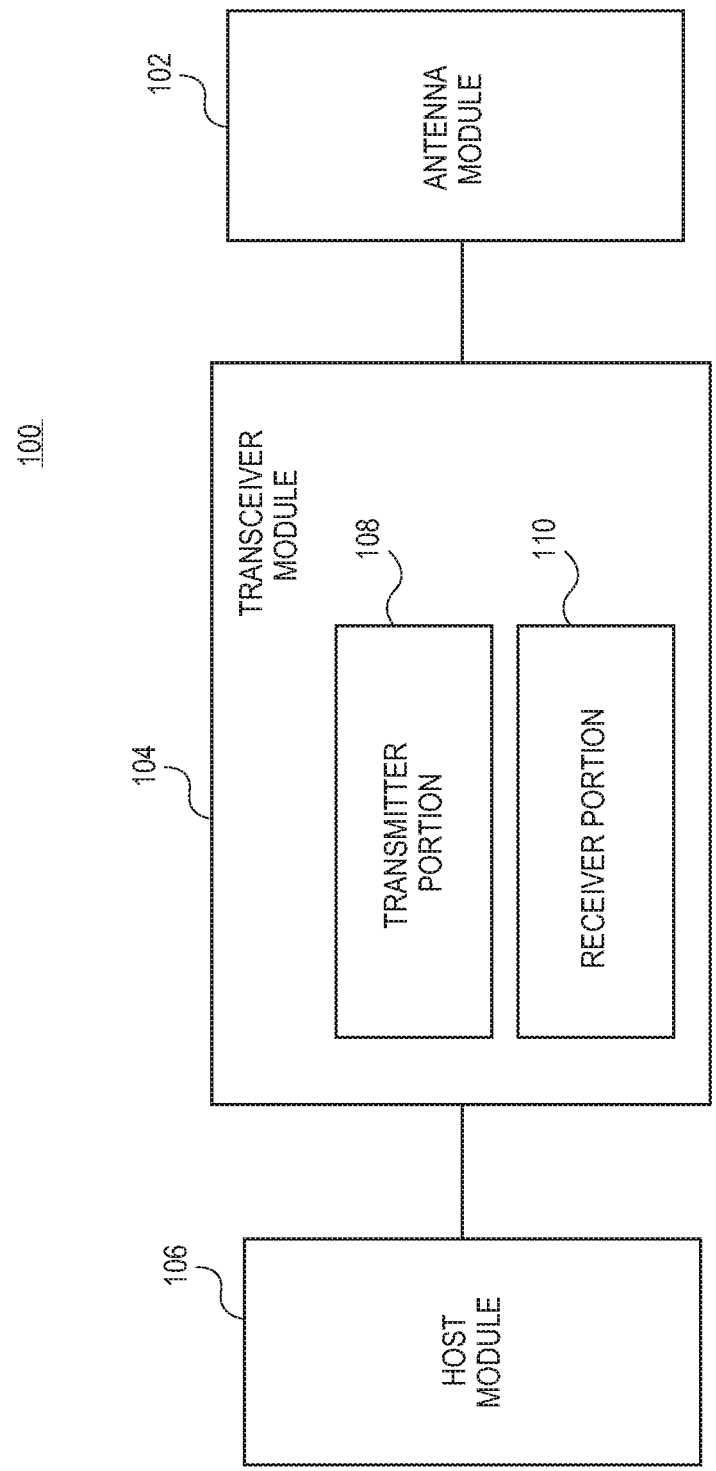

SYSTEMS, APPARATUS AND METHODS USING SYNC BEACONS IN NEIGHBOR AWARENESS NETWORKING (NAN)

RELATED CASE

This application is a continuation of, claims the benefit of and priority to previously filed U.S. patent application Ser. No. 14/125,870, filed Dec. 12, 2013, which is a national stage entry of PCT/US2013/052288 filed Jul. 26, 2013, which priority to U.S. Provisional Patent Application No. 61/809,988, filed on 9 Apr. 2013; all of the above are entitled "SYSTEMS, APPARATUS AND METHODS USING SYNC BEACONS IN NEIGHBOR AWARENESS NETWORKING (NAN)". All of the above are incorporated herein by reference in their entirety.

BACKGROUND

In order to keep devices in sync in Neighbor Awareness Networking (NAN), NAN devices require the transmission of a Sync Beacon.

Thus, there are general needs for improved methods of transmitting Sync Beacons by such NAN devices.

BRIEF DESCRIPTION OF THE DRAWINGS

In the drawings, like reference numbers generally indicate identical, functionally similar, and/or structurally similar elements. The drawing in which an element first appears is indicated by the leftmost digit(s) in the reference number. The present invention will be described with reference to the accompanying drawings, wherein:

FIG. 1 is a diagram of an exemplary wireless communications device.

DETAILED DESCRIPTION

In the following description, numerous specific details are set forth. However, it is understood that embodiments of the invention may be practiced without these specific details. In other instances, well-known methods, structures and techniques have not been shown in detail in order not to obscure an understanding of this description.

References to "one embodiment," "an embodiment," "example embodiment," "various embodiments," etc., indicate that the embodiment(s) of the invention so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

Some embodiments may be used in conjunction with devices and/or networks operating in accordance with existing Wireless-Gigabit-Alliance (WGA) specifications (Wireless Gigabit Alliance, Inc WiGig MAC and PHY Specification Version 1.1, April 2011, Final specification) and/or future versions and/or derivatives thereof, devices and/or networks operating in accordance with existing IEEE 802.11 standards (IEEE 802.11-2012, IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012; IEEE802.11 task group ac (TGac) ("IEEE802.11-09/0308r12—TGac Channel Model Addendum Document"); IEEE 802.11 task group ad (TGad) (IEEE P802.11ad Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band)) and/or future versions and/or derivatives thereof, devices and/or networks operating in accordance with existing WirelessHD™ specifications and/or future versions and/or derivatives thereof, units and/or devices which are part of the above networks, and the like.

Problem

In order to keep devices in sync in the Neighbor Awareness Networking (NAN), NAN devices have to transmit a Sync Beacon. Suggested and existing beacon formats for sync beacons reuse the existing beacon format for a Sync Beacon. However, this will cause confusion for legacy devices operating in Neighbor Awareness Networking as legacy devices may think the NAN device is an access point (AP) and try to associate with it.

There is no prior solution for this issue. The existing, basic and straightforward approach is simply inferior to the solution provided below with respect to keeping NAN devices in sync when operating in Neighbor Awareness Networking.

Solution

To solve the problems set forth above, embodiments herein provide keeping devices in sync in Neighbor Awareness Networking (NAN), by requiring NAN devices to transmit Sync Beacons with two options for Sync Beacon frames.

Option 1: Use Public Action frame for Sync Beacons.

In the embodiment of option 1, a NAN Sync Beacon is defined as a vendor specific public action frame as defined in IEEE Standard 802.11-2012. This standard is set forth in more detail above.

Embodiments herein provide that the Action field of a NAN Sync Beacon may be included in, but are not limited to, the following fields set forth below in Table 1.

TABLE 1

General format of NAN Sync Beacon frame

| Field | Size (octets) | Value (Hexadecimal) | Description |
|---|---|---|---|
| Category | 1 | 0x04 | IEEE 802.11 public action usage. |
| Action field | 1 | 0x09 | IEEE 802.11 vendor specific usage. |
| OUI | 3 | 50 6F 9A | WFA specific OUI. |
| OUI type | 1 | 0x0?? (to be assigned) | Identifying the type or version of action frame. Setting to TBD indicates WFA NAN v1.0. |
| OUI Subtype | 1 | 0 | Identifying the type of NAN public action frame. Set to indicate Sync Beacon frame. |
| Timestamp | 8 | variable | This field represents the value of the timing synchronization function (TSF) timer of a frame's source. |

TABLE 1-continued

General format of NAN Sync Beacon frame

| Field | Size (octets) | Value (Hexadecimal) | Description |
|---|---|---|---|
| NAN ID | 2 | variable | Identifying the identifier of NAN |
| Sync Beacon Interval | 2 | variable | Interval for transmitting the synchronization beacon. |
| Discovery Window Duration | 2 | variable | Minimum duration that devices that need to be on to receive NAN frames |
| Discovery Period | 4 | variable | Interval between Discovery Windows |

In embodiments herein, Category, Action field, OUI, OUI type and OUI subtype fields are standard fields for a public action frame. However, Timestamp, NAN ID, Sync Beacon Interval, Discovery Window, Discovery Period fields are the fields designed for Sync Beacon.

Option 2: Use a new frame Subtype to define a new frame format for the Sync Beacon.

The embodiment of option 2 uses a new frame Subtype to define a new frame format for the Sync Beacon.

The format of the Sync Beacon is shown below in Table 2.

TABLE 2

General format of NAN Sync Beacon frame with new frame Subtype (FCS)

| Field | Size (octets) | Value (Hexadecimal) | Description |
|---|---|---|---|
| FC | 2 | Variable | See table 3. |
| SA | 6 | Variable | MAC address of the device transmitting Sync Beacon |
| Timestamp | 8 | variable | This field represents the value of the timing synchronization function (TSF) timer of a frame's source. |
| NAN ID | 2 | variable | Identifying the identifier of NAN |
| Sync Beacon Interval | 2 | variable | Interval for transmitting the synchronization beacon. |
| Discovery Window Duration | 2 | variable | Minimum duration that devices that need to be on to receive NAN frames |
| Discovery Period | 4 | variable | Interval between Discovery Windows |
| FCS | 4 | | |

Embodiments herein may use the type and subtype field settings for the Sync beacon as given in Table 3 below.

TABLE 3

FC field Type and Subtype setting

| Type | Subtype |
|---|---|
| 11 | 0010 or 0011 |

In summary, devices that implement NAN discovery benefit from embodiments described by transmitting sync beacon frames utilizing the two options set forth above: Using Public Action frame for Sync Beacon; or using a new frame Subtype to define a new frame format for the Sync Beacon.

The techniques described herein have been described in the context of IEEE 802.11 (WiFi) networks. However, embodiments are not limited to such networks.

FIG. 1 is a diagram of an implementation 100 that may be included in a wireless device, such as a STA and/or an access point. Device 100 may perform techniques, as described herein, such as using Sync Beacon frames in neighbor awareness networking (NAN) devices to enable the devices keep in sync. As shown in FIG. 4, implementation 100 may include an antenna module 102, a transceiver module 104, and a host module 106. These elements may be implemented in hardware, software, or any combination thereof.

Antenna module 102 provides for the exchange of wireless signals with remote devices. Moreover, antenna module 102 may transmit wireless signals through one or more directional radiation patterns. Thus, antenna module 102 may include multiple antennas and/or multiple radiating elements (e.g., phased-array radiating elements).

Transceiver module 104 provides an interface between antenna module 102 and host module 106. For instance, transmitter portion 108 within transceiver module 104 receives symbols from host module 106 and generates corresponding signals for wireless transmission by antenna module 102. This may involve operations, such as modulation, amplification, and/or filtering. However, other operations may be employed.

Conversely, receiver portion 110 within transceiver module 104 obtains signals received by antenna module 102 and generates corresponding symbols. In turn, receiver portion 110 provides symbols to host module 106. This generation of symbols may involve operations, including (but not limited to) demodulation, amplification, and/or filtering.

The symbols exchanged between host module 106 and transceiver module 104 may form messages or information associated with one or more protocols, and/or one or more user applications. Thus, host module 106 may perform operations corresponding to such protocol(s) and/or user application(s). Such operations may include NAN device sync operations, as described herein. Further, exemplary protocols include various media access, network, transport and/or session layer protocols. Exemplary user applications include telephony, messaging, e-mail, web browsing, content (e.g., video and audio) distribution/reception, and so forth.

In addition, host module 106 may exchange control information with transceiver module 104. This control information may pertain to the operation and status of transceiver module 104. For instance, this control information may include directives that host module 106 sends to transceiver module 104. Such directives may establish operating parameters/characteristics for transceiver module 104. Also, this control information may include data (e.g., operational status information) that host module 106 receives from transceiver module 104. It may further include transmission of Sync Beacon frames using Public Action frames for the Sync Beacon. In addition to a Category, Action field, OUI, OUI type and OUI subtype fields that are standard fields for a public action frame, Timestamp, NAN ID, Sync Beacon Interval, Discovery Window and Discovery Period fields are included and are fields designed for the Sync Beacon. The host module 104 may further provide for the transmission of Sync Beacon frames that may use a new frame subtype to define a new frame format for the Sync Beacon.

As described above, transmitter portion 108 generates signals from symbols, and receiver portion 110 generates symbols from received signals. To provide such features, transmitter portion 108 and receiver portion 110 may each include various components, such as modulators, demodulators, amplifiers, filters, buffers, upconverters, and/or downconveters. Such components may be implemented in hardware (e.g., electronics), software, or any combination thereof.

The techniques described herein may be embodied in a computer-readable medium for configuring a computing system to execute the method. The computer readable media may include, for example and without limitation, any number of the following: magnetic storage media including disk and tape storage media; optical storage media such as compact disk media (e.g., CD-ROM, CD-R, etc.) and digital video disk storage media; holographic memory; nonvolatile memory storage media including semiconductor-based memory units such as FLASH memory, EEPROM, EPROM, ROM; ferromagnetic digital memories; volatile storage media including registers, buffers or caches, main memory, RAM, etc.; and data transmission media including permanent and intermittent computer networks, point-to-point telecommunication equipment, carrier wave transmission media, the Internet, just to name a few. Other new and various types of computer-readable media may be used to store and/or transmit the software modules discussed herein. Computing systems may be found in many forms including but not limited to mainframes, minicomputers, servers, workstations, personal computers, notepads, personal digital assistants, various wireless devices and embedded systems, just to name a few. A typical computing system includes at least one processing unit, associated memory and a number of input/output (I/O) devices. A computing system processes information according to a program and produces resultant output information via I/O devices.

Realizations in accordance with the present invention have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the various configurations may be implemented as a combined structure or component. These and other variations, modifications, additions, and improvements may fall within the scope of the invention as defined in the claims that follow.

The invention claimed is:

1. An apparatus, comprising:
a processing unit;
memory storing instructions operable on the processing unit, the instructions, when executed, cause the processing unit to:
provide for transmission a neighbor awareness networking (NAN) synchronization beacon frame to keep devices in synchronization in a NAN, the NAN synchronization beacon comprising an organizationally unique identifier (OUI) field, an OUI type field, a NAN identification field, and a field comprising an indication of an interval between discovery windows, the OUI field comprising a Wi-Fi alliance (WFA) specific OUI, the OUI type field comprising a type and version of the NAN, and the NAN identification field comprising an identifier of the NAN; and
cause transmission of the NAN synchronization beacon frame.

2. The apparatus of claim 1, the NAN synchronization beacon frame comprising a timestamp field, the timestamp field comprising a value of a timing synchronization function (TSF) timer of a source of the NAN synchronization beacon frame.

3. The apparatus of claim 1, the NAN synchronization beacon frame comprising an indication of vendor specific usage.

4. The apparatus of claim 1, the NAN synchronization beacon frame comprising an interval to transmit the NAN synchronization beacon frames.

5. The apparatus of claim 1, the NAN synchronization beacon frame comprising a minimum duration that devices need to be on to receive NAN synchronization beacon frames.

6. The apparatus of claim 1, the processing unit to send control information to a transceiver to cause transmission of the NAN synchronization beacon frame.

7. The apparatus of claim 1, comprising a transceiver comprising a transmitter and a receiver.

8. The apparatus of claim 7, comprising one or more antennas coupled with the transceiver, the one or antennas each comprising radiating elements.

9. A non-transitory computer-readable storage medium, comprising a plurality of instructions, that when executed, enable processing circuitry to:
provide for transmission a neighbor awareness networking (NAN) synchronization beacon frame to keep devices in synchronization in a NAN, the NAN synchronization beacon comprising an organizationally unique identifier (OUI) field, an OUI type field, a NAN identification field, and a field comprising an indication of an interval between discovery windows, the OUI field comprising a Wi-Fi alliance (WFA) specific OUI, the OUI type field comprising a type and version of the NAN, and the NAN identification field comprising an identifier of the NAN; and
cause transmission of the NAN synchronization beacon frame.

10. The non-transitory computer-readable storage medium of claim 9, the NAN synchronization beacon frame comprising a timestamp field, the timestamp field comprising a value of a timing synchronization function (TSF) timer of a source of the NAN synchronization beacon frame.

11. The non-transitory computer-readable storage medium of claim 9, the NAN synchronization beacon frame comprising an indication of vendor specific usage.

12. The non-transitory computer-readable storage medium of claim 9, the NAN synchronization beacon frame comprising an interval to transmit the NAN synchronization beacon frames.

13. The non-transitory computer-readable storage medium of claim 9, the NAN synchronization beacon frame comprising a minimum duration that devices need to be on to receive NAN synchronization beacon frames.

14. The non-transitory computer-readable storage medium of claim 9, comprising a plurality of instructions, that when executed, enable processing circuitry to send control information to a transceiver to cause transmission of the NAN synchronization beacon frame.

15. A computer-implemented method, comprising:
providing for transmission a neighbor awareness networking (NAN) synchronization beacon frame to keep devices in synchronization in a NAN, the NAN synchronization beacon comprising an organizationally unique identifier (OUI) field, an OUI type field, a NAN identification field, and a field comprising an indication of an interval between discovery windows, the OUI field comprising a Wi-Fi alliance (WFA) specific OUI, the OUI type field comprising a type and version of the NAN, and the NAN identification field comprising an identifier of the NAN; and cause transmission of the NAN synchronization beacon frame.

16. The computer-implemented method of claim 15, the NAN synchronization beacon frame comprising a timestamp field, the timestamp field comprising a value of a timing synchronization function (TSF) timer of a source of the NAN synchronization beacon frame.

17. The computer-implemented method of claim 15, the NAN synchronization beacon frame comprising an indication of vendor specific usage.

18. The computer-implemented method of claim 15, the NAN synchronization beacon frame comprising an interval to transmit the NAN synchronization beacon frames.

19. The computer-implemented method of claim 15, the NAN synchronization beacon frame comprising a minimum duration that devices need to be on to receive NAN synchronization beacon frames.

20. The computer-implemented method of claim 15, comprising sending control information to a transceiver to cause transmission of the NAN synchronization beacon frame.

* * * * *